(12) United States Patent
Zwilling et al.

(10) Patent No.: US 7,543,665 B2
(45) Date of Patent: Jun. 9, 2009

(54) POWER SYSTEM

(75) Inventors: Edward Lee Zwilling, Washington, IL (US); Rodwan Tarek Adra, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 45 days.

(21) Appl. No.: 11/393,949

(22) Filed: Mar. 31, 2006

(65) Prior Publication Data

US 2007/0235236 A1 Oct. 11, 2007

(51) Int. Cl.
*B60W 20/00* (2006.01)
*B60W 10/08* (2006.01)

(52) U.S. Cl. .............................. 180/65.285; 180/65.25

(58) Field of Classification Search ................ 180/65.2, 180/65.3, 65.4, 65.8; 903/942, 943
See application file for complete search history.

(56) References Cited

U.S. PATENT DOCUMENTS

| | | | |
|---|---|---|---|
| 5,770,909 A | 6/1998 | Rosen et al. | |
| 5,899,085 A | 5/1999 | Williams | |
| 6,054,844 A | 4/2000 | Frank | |
| 6,269,895 B1 | 8/2001 | Tanuguchi et al. | |
| 6,359,405 B1 | 3/2002 | Tsurumi | |
| 6,422,331 B1 | 7/2002 | Ochiai et al. | |
| 6,469,462 B2 | 10/2002 | Shimane et al. | |
| 6,483,198 B2 | 11/2002 | Schmitz et al. | |
| 6,573,675 B2 | 6/2003 | Schmitz et al. | |
| 6,611,115 B2 * | 8/2003 | Wakashiro et al. | 318/139 |
| 6,615,940 B2 * | 9/2003 | Morisawa | 180/65.1 |
| 6,622,804 B2 | 9/2003 | Schmitz et al. | |
| 6,683,389 B2 | 1/2004 | Geis | |
| 6,720,792 B2 * | 4/2004 | Raftari et al. | 324/772 |
| 6,722,230 B2 * | 4/2004 | Sakamoto et al. | 74/661 |
| 6,722,456 B2 * | 4/2004 | Hisada | 180/65.2 |
| 6,722,457 B2 * | 4/2004 | Yamaguchi et al. | 180/65.2 |
| 6,742,487 B2 | 6/2004 | Yamaguchi et al. | |
| 6,751,960 B2 * | 6/2004 | Arimitsu et al. | 60/706 |
| 6,902,018 B2 * | 6/2005 | Hisada et al. | 180/65.1 |
| 6,965,183 B2 | 11/2005 | Dooley | |
| 7,006,906 B2 | 2/2006 | Kobayashi et al. | |
| 7,010,400 B2 | 3/2006 | Hisada et al. | |
| 7,073,615 B2 * | 7/2006 | Mack | 180/65.2 |
| 7,077,224 B2 * | 7/2006 | Tomatsuri et al. | 180/65.3 |
| 7,117,965 B2 * | 10/2006 | Yatabe et al. | 180/65.3 |
| 2003/0205422 A1 | 11/2003 | Morrow et al. | |
| 2004/0204291 A1 * | 10/2004 | Atarashi et al. | 477/183 |
| 2005/0082992 A1 * | 4/2005 | Aizawa et al. | 318/66 |
| 2005/0151517 A1 | 7/2005 | Cook et al. | |
| 2005/0184529 A1 | 8/2005 | Ueda | |

FOREIGN PATENT DOCUMENTS

WO WO 03/025370 A1 3/2003

\* cited by examiner

*Primary Examiner*—Jeffrey J Restifo
(74) *Attorney, Agent, or Firm*—Finnegan, Henderson, Farabow, Garrett & Dunner

(57) ABSTRACT

A power system includes a power source, a first electric machine drivingly connected to the power source, a second electric machine drivingly connected to the power source, and power-system controls. The power-system controls may include a bidirectional power regulator operable to cause the first electric machine to operate as an electric motor and also operable to cause and regulate generation of electricity by the first electric machine. Additionally, the power-system controls may include a unidirectional power regulator operable to cause and regulate generation of electricity by the second electric machine.

10 Claims, 3 Drawing Sheets

POWER SYSTEM

TECHNICAL FIELD

The present disclosure relates to power systems and, more particularly, to power systems having one or more electric machines.

BACKGROUND

Many power systems include an electric machine drivingly connected to a power source, such as an internal combustion engine. Such power systems often have controls that are operable to cause the electric machine to generate electricity when the power source is driving the electric machine. Using an electric machine to convert power produced by a power source into electricity enables using power from the power source to operate other electric machines. In some circumstances, it may be desirable to operate the electric machine of such a power system as an electric motor rather than an electric generator. Unfortunately, the controls of many such power systems are not capable of operating the electric machine as an electric motor.

U.S. Pat. No. 6,622,804 to Schmitz et al. ("the '804 patent") shows a power system having an electric machine drivingly connected to an engine and controls operable to cause the electric machine to operate as an electric generator and also operable to cause the electric machine to operate as an electric motor. The power system disclosed by the '804 patent is a series type hybrid electric power system for a vehicle. The power system's controls include an electronic control unit and a power converter. The power converter is connected between the electric machine and a battery array. The electronic control unit and the power converter of the '804 patent also start the engine by operating the electric machine as an electric motor driving the engine. Subsequently, the electronic control unit and the power converter cause the electric machine to generate electricity using power from the engine.

Although the power system of the '804 patent includes controls operable to cause the electric machine to operate as an electric generator and also operable to cause the electric machine to operate as an electric motor, certain disadvantages persist. For example, employing a single power converter to regulate electric current flowing into and out of the electric machine may entail compromises. Various factors may make it desirable to transmit electricity at significantly higher rates when the electric machine is operating as an electric generator than when the electric machine is operating as an electric motor. Additionally, the power converter's power capacity for regulating the flow of electricity when the electric machine is operating as an electric motor may be the same as the power converter's power capacity for regulating the flow of electricity when the electric machine is operating as an electric generator. Accordingly, the power converter may have more power capacity than necessary for transmitting power to the electric machine when it is operating as an electric motor and/or less power capacity than desired for transmitting power from the electric machine when it is operating as an electric generator.

As a result, the overall component cost of the power system of the '804 patent may be undesirably high and/or the power system may have compromised capacity for generation of electricity. Power converters that are operable to regulate both generation of electricity by an electric machine and consumption of electricity by an electric machine operating as an electric motor are generally more expensive per unit of capacity than power converters that are only operable to regulate generation of electricity. Accordingly, configuring the power converter of the '804 patent with power capacity that is higher than necessary for operation of the electric machine as an electric motor in order to provide the desired capacity for generation of electricity may make the power converter undesirably expensive. Conversely, configuring the power converter with power capacity substantially equal to the capacity necessary for operating the electric machine as an electric motor may undesirably limit the capacity to regulate generation of electricity by the power system.

The power system of the present disclosure solves one or more of the problems set forth above.

SUMMARY OF THE INVENTION

One disclosed embodiment relates to a power system having a power source, a first electric machine drivingly connected to the power source, a second electric machine drivingly connected to the power source, and power-system controls. The power-system controls may include a bidirectional power regulator operable to cause the first electric machine to operate as an electric motor and also operable to cause and regulate generation of electricity by the first electric machine. Additionally, the power-system controls may include a unidirectional power regulator operable to cause and regulate generation of electricity by the second electric machine.

Another embodiment relates to a method of operating a power system having a power source and one or more electric machines drivingly connected to the power source. The method may include selectively operating a bidirectional power regulator to cause one or more of the electric machines to operate as an electric motor. The method may also include selectively operating the bidirectional power regulator to cause and regulate generation of electricity by one or more of the electric machines. Additionally, the method may include selectively operating a unidirectional power regulator to cause and regulate generation of electricity by one or more of the electric machines.

A further embodiment relates to a power system having a power source, an electric machine drivingly connected to the power source, and power-system controls. The power-system controls may include a bidirectional power regulator operable to cause the electric machine to operate as an electric motor and also operable to cause and regulate generation of electricity by the electric machine. Additionally, the power-system controls may include a unidirectional power regulator operable to cause and regulate generation of electricity by the electric machine.

DETAILED DESCRIPTION

Figure 1:
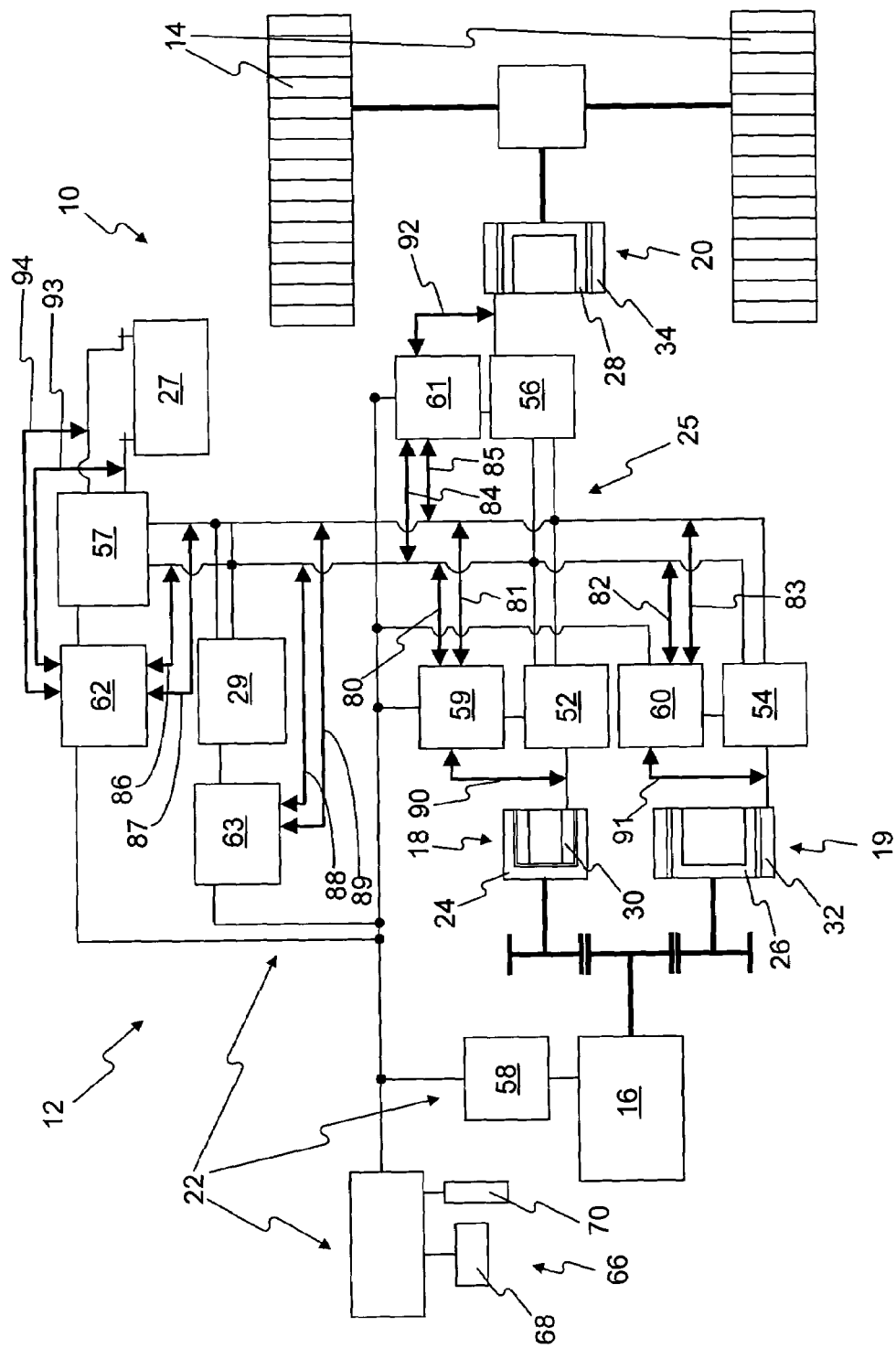
FIG. 1 is a schematic illustration of a first embodiment of a machine having a power system according to the present disclosure.

FIG. 1 illustrates one embodiment of a machine 10 having a power system 12 according to the present disclosure.

Machine 10 may be a mobile machine having one or more propulsion devices 14 in addition to power system 12.

Power system 12 may include a power source 16, an electric machine 18, an electric machine 19, an electric machine 20, an electrical power-transfer network 25, one or more energy sources and/or sinks, and power-system controls 22. Power source 16 may be any type of device configured to produce power, including, but not limited to, a diesel engine, a gasoline engine, a gaseous fuel-driven engine, and a gas turbine engine.

Each electric machine 18, 19, 20 may be any type of machine configured to operate as an electric motor and/or an electric generator. Electric machines 18, 19, 20 may each include a rotor 24, 26, 28 disposed adjacent a stator winding 30, 32, 34. Rotors 24, 26 may be drivingly connected to power source 16. Each stator winding 30, 32, 34 may be either a single-phase stator winding or a multiple-phase stator winding, such as a three-phase stator winding. In some embodiments, electric machine 18 may be a wound-rotor synchronous type electric machine, an induction-type electric machine, a switched-reluctance type electric machine, a permanent-magnet type electric machine, or a direct current type electric machine. Additionally, in some embodiments, electric machine 19 may be a wound-rotor synchronous type electric machine, a permanent-magnet type electric machine, or a direct current type electric machine.

Electrical power-transfer network 25 may be any type of system configured to transfer electricity between electrical components of power system 12. Electrical power-transfer network 25 may include various types of electricity-conducting components, including, but not limited to, wires and switching devices.

The one or more energy sources and/or sinks of power system 12 may include an electrical storage device 27 and a braking resistor and chopper 29. Electrical storage device 27 may be electrically connected to electrical power-transfer network 25 by a power regulator 57. Electrical storage device 27 may be any type of device configured to receive electric current from electrical power-transfer network 25 and store at least some of the energy of the electric current for later use in supplying electric current to one or more devices of power system 12. For example, electrical storage device 27 may be a battery or a capacitor. Braking resistor and chopper 29 may be electrically connected to electrical power-transfer network 25. Braking resistor and chopper 29 may include one or more components with electrical resistance (not shown) and one or more components (not shown) operable to regulate the flow of electricity between electrical power-transfer network 25 and the one or more components with electrical resistance. Thus, braking resistor and chopper 29 may be operable to dissipate electricity from electrical power-transfer network 25 at a controllable rate.

Power-system controls 22 may include power regulators 52, 54, 56, 57, controllers 58, 59, 60, 61, 62, 63 and an operator interface 66. Each power regulator 52, 54, 56 may be connected between a stator winding 30, 32, 34 of an electric machine 18, 19, 20 and electrical power-transfer network 25. Each power regulator 52, 54, 56 may be operable to regulate one or more aspects of operation of the electric machine 18, 19, 20 and power transfer between that electric machine 18, 19, 20 and electrical power-transfer network 25. Each power regulator 52, 54, 56 may be operable to regulate the rate of power transfer between the stator winding 30, 32, 34 it is connected to and electrical power-transfer network 25. Additionally, in some embodiments, one or more of power regulators 52, 54, 56 may be operable to regulate one or more timing aspects of electric current flowing to/from a stator winding 30, 32, 34 or electric current in electrical power-transfer network 25. For example, a power regulator 52, 54, 56 may be operable to control the phase and/or frequency of alternating current flowing to/from a stator winding 30, 32, 34. Furthermore, in some embodiments, a power regulator 52, 54, 56 may be operable to convert power between two different forms, such as alternating current and direct current, as the power flows between a stator winding 30, 32, 34 and electrical power-transfer network 25.

Power regulator 52 may be a bidirectional power regulator operable to regulate power transmission in both directions between stator winding 30 and electrical power-transfer network 25. In such embodiments, power regulator 52 may be operable to cause and regulate generation of electricity in stator winding 30 and also operable to regulate current supply to stator winding 30 in such a manner to cause electric machine 18 to operate as an electric motor. In embodiments where power regulator 52 is a bidirectional power regulator, power regulator 52 may include SCRs (sillicon controller rectifiers), GTOs (gate turn-offs), and/or IGBTs (insulated gate bipolar transistors). In some embodiments, power regulator 56 may also be a bidirectional power regulator operable to regulate power transfer in both directions between stator winding 34 and electrical power-transfer network 25.

In contrast to power regulators 52, 56, power regulator 54 may be a unidirectional power regulator operable to regulate power transfer in only one direction between stator winding 30 and electrical power-transfer network 25. For example, power regulator 54 may be operable to cause and regulate generation of electricity in stator winding 32 by electric machine 19, but not operable to regulate power transmission to electric machine 19 in a manner to cause it to operate as an electric motor. In some embodiments where power regulator 54 is a unidirectional power regulator, power regulator 54 may include diode rectifiers and/or simple SCRs.

Power regulator 57 may be operable to regulate one or more aspects of power transfer between electrical power-transfer network 25 and electrical storage device 27. For example, power regulator 57 may be operable to regulate the rate and direction of electricity transfer between electrical power-transfer network 25 and electrical storage device 27. Additionally, power regulator 57 may be operable to regulate any other aspect of power transfer between electrical power-transfer network 25 and electrical storage device 27.

Operator interface 66 may include any types of components configured to transmit operator inputs to other components of machine 10. For example, operator interface 66 may include an accelerator pedal 68 and a brake pedal 70 for receiving acceleration and braking requests from an operator, and operator interface 66 may include various other components for transmitting these and other requests to other components of power system 12.

Each controller 58-63 may be any type of information processor configured to control one or more aspects of the operation of power system 12. Each controller 58-63 may include one or more processors (not shown) and memory devices (not shown). Controllers 58-63 may be operatively connected to one another so that they may share information. Controller 58 may also be operatively connected to power source 16 and configured to control one or more aspects of the operation of power source 16, such as operation of a fuel-metering system (not shown). Controller 58 may be a dedicated controller for controlling power source 16, or controller 58 may be operable to monitor and/or control one more other components of machine 10. Each controller 59, 60, 61, 62 may be operatively connected to and configured to control power regulators 52, 54, 56, 57. Controllers 59-62 may be dedicated controllers for controlling the operation of power regulators 52, 54, 56, 57, respectively, or one or more of controllers 59-62 may be configured to monitor and/or control one or more other components of machine 10. Controller 63 may be operatively connected to braking resistor and chopper 29 and configured to control one or more aspects of the operation thereof. For example, controller 63 may be operable to control the one or more components of braking resistor and chopper 29 that regulate transfer of electricity between electrical power-transfer network 25 and braking resistor and chopper 29.

Each of controllers 58-63 may be operatively connected to various components configured to provide them with information for use in controlling power source 16, power regulator 52, power regulator 54, power regulator 56, power regulator 57, and braking resistor and chopper 29, respectively. For example, power-system controls 22 may include information channels 80-89 configured to provide controllers 59-63 with information relating to electrical activity in electrical power-transfer network 25. Additionally, power-system controls 22 may include information channels 90-92 configured to provide controllers 59-61 with information relating to electrical activity in stator windings 30, 32, 34 and/or the electrical connections between stator windings 30, 32, 34 and power regulators 52, 54, 56. Power-system controls 22 may also include information channels 93, 94 configured to provide controller 62 with information relating to the electrical activity in electrical storage device 27 and the electrical connections between electrical storage device 27 and power regulator 57. Controller 63 may receive information relating to electrical activity in braking resistor and chopper 29 through the operative connection between controller 63 and braking resistor and chopper 29. Additionally, controllers 59-63 may all be operatively connected to operator interface 66 so as to receive information relating to operator requests. Furthermore, each of controllers 58-63 may be operatively connected to various other sensors, controllers, and/or other sources of information not shown in FIG. 1.

Each propulsion device 14 may be any type of component configured to receive power from power system 12 and propel machine 10 by transferring that power to the environment surrounding machine 10. For example, as is shown in FIG. 1, propulsion devices 14 may be track units. Alternatively, propulsion devices 14 may be wheels, other types of devices configured to transmit power to the ground, propellers, or other types of devices configured to move fluid to propel machine 10. As FIG. 1 shows, propulsion devices 14 may be drivingly connected to rotor 28 of electric machine 20.

Figure 2:
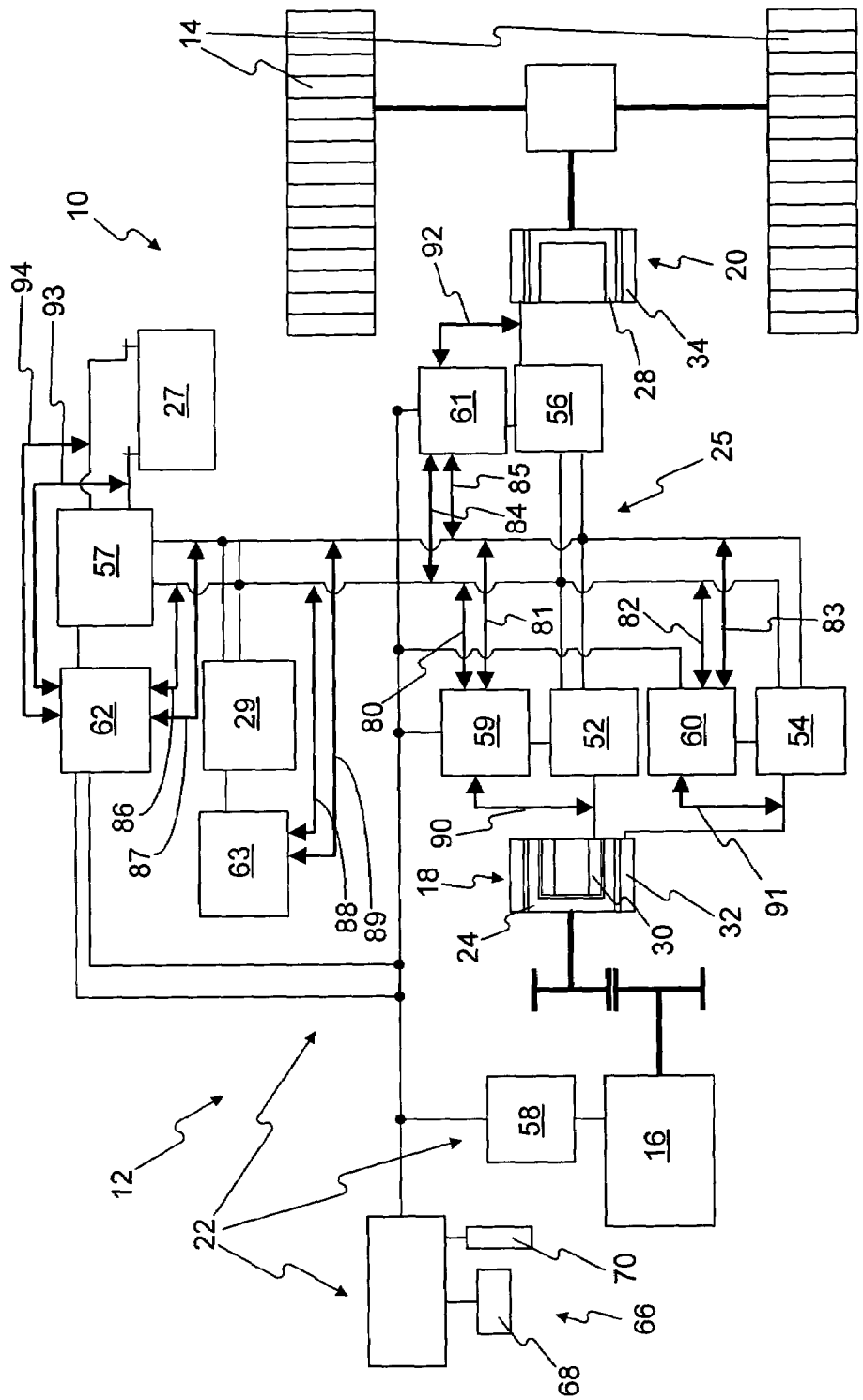
FIG. 2 is a schematic illustration of a second embodiment of a machine having a power system according to the present disclosure.

FIG. 2 shows machine 10 with a second embodiment of power system 12. The embodiment shown in FIG. 2 is generally the same as the embodiment shown in FIG. 1, except that stator winding 32 is part of electric machine 18, and power system 12 does not include electric machine 19. In this embodiment, stator windings 30, 32 may be in separate stators, as FIG. 2 shows, or stator windings 30, 32 may be incorporated into a common stator. As with the embodiment illustrated in FIG. 1, power regulator 52 may be a bidirectional power regulator operable to cause and regulate generation of electricity in stator winding 30 and also operable to regulate power transfer to stator winding 30 in a manner to cause electric machine 18 to operate as an electric motor. Additionally, power regulator 54 may be a unidirectional power regulator operable to cause and regulate generation of electricity in stator winding 32, but not operable to regulate power transfer to stator winding 32 in a manner to cause or contribute to electric machine 18 operating as an electric motor.

Figure 3:
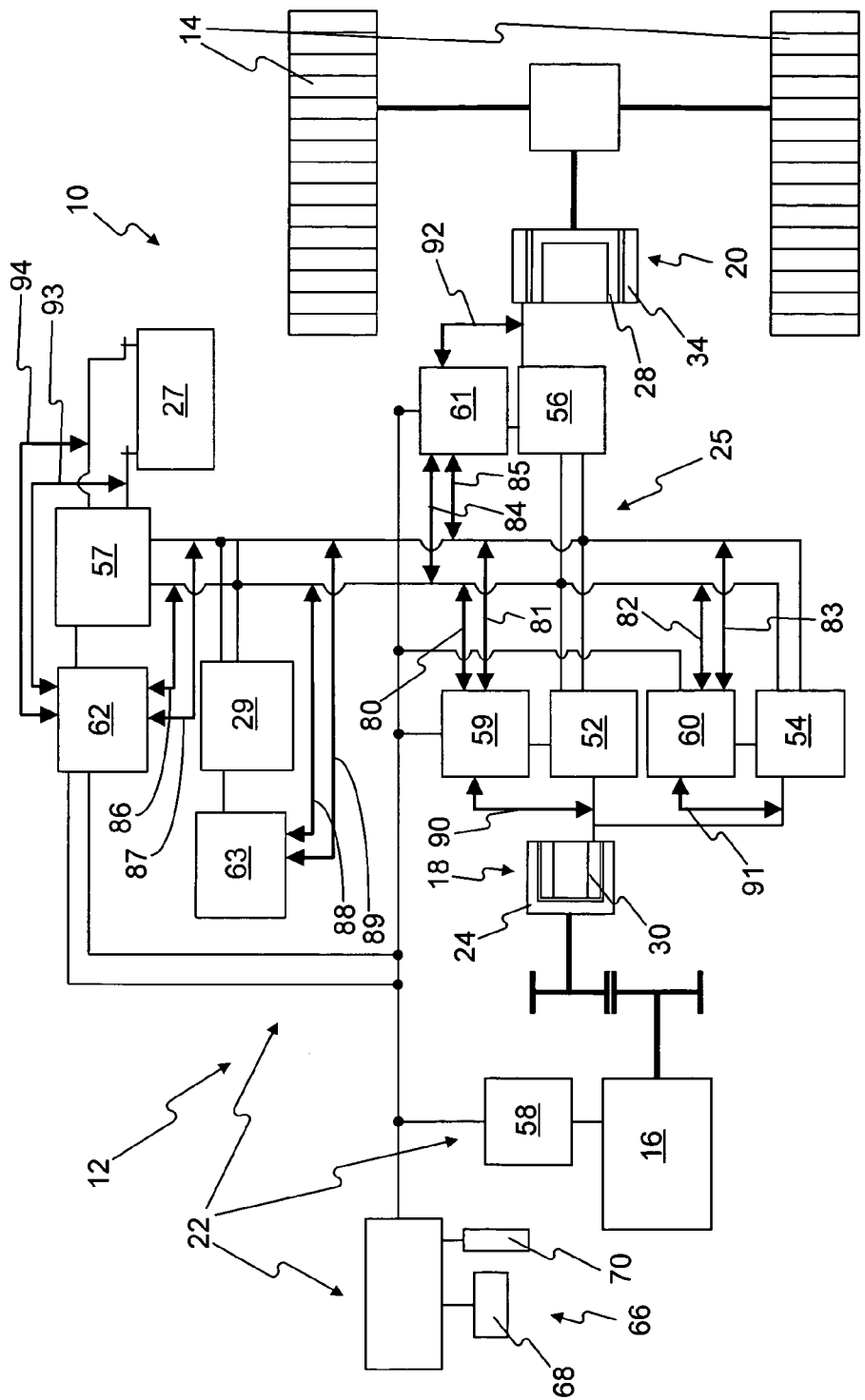
FIG. 3 is a schematic illustration of a third embodiment of a machine having a power system according to the present disclosure.

FIG. 3 shows machine 10 with another embodiment of power system 12. This embodiment may be the same as the embodiment shown in FIG. 2, except that power regulator 52 and power regulator 54 are both connected to stator winding 30, and stator winding 32 is omitted. As in the embodiments shown in FIGS. 1 and 2, power regulator 52 may be a bidirectional power regulator and power regulator 54 may be a unidirectional power regulator. Additionally, in the embodiment shown in FIG. 3, power-system controls 22 may include provisions (not shown) for selectively disconnecting power regulator 54 from stator winding 30. Such provisions may include, for example, SCRs or mechanical switching devices. Such provisions may be used to disconnect power regulator 54 from stator winding 30 when power regulator 52 is regulating power transfer to stator winding 30 in a manner to cause electric machine 18 to operate as an electric motor, which may prevent the electricity delivered to stator winding 30 from circulating between power regulator 52 and power regulator 54.

Additionally, the embodiment shown in FIG. 3 may have provisions for ensuring that power is properly distributed between power regulator 52 and power regulator 54 when power regulators 52 and 54 are both regulating generation of electricity in stator winding 30. For example, the connections between stator winding 30 and power regulators 52, 54 may be configured with impedances such that power is distributed between power regulators 52, 54 in proportion to their respective power capacities. Alternatively, stator winding 30 may be wound in such a manner to ensure such a distribution of power transfer to power regulators 52, 54. In addition, controlling features in controllers 59, 60 may ensure that power is properly proportioned between power regulators 52, 54 when regulating generation of electricity by stator winding 30.

Power-system controls 22 are not limited to the configurations shown in FIGS. 1-3. For example, in place of bidirectional power regulator 52, power-system controls 22 may include multiple bidirectional power regulators. Similarly, in place of unidirectional power regulator 54, power-system controls 22 may include multiple unidirectional power regulators. Additionally, power-system controls 22 may include one or more other controllers in addition to controllers 58-63, and/or power-system controls 22 may omit one or more of controllers 58-63. In some embodiments, one controller may be operatively connected to and configured to control the operation of two or more of power source 16, power regulator 52, power regulator 54, power regulator 56, power regulator 57, and braking resistor and chopper 29. Furthermore, power-system controls 22 may include various other types of logic systems, such as hard-wired electric logic circuits. Moreover, in some embodiments, power regulator 56 may be a unidirectional power regulator, rather than a bidirectional power regulator.

Additionally, the general configurations of power system 12 and machine 10 are not limited to those shown in FIGS. 1-3. For example, power source 16, electric machine 18, electric machine 19, electric machine 20, and propulsion devices 14 may be connected in different manners. Power system 12 may include various additional power-transfer components, such as additional gears, shafts, pulleys, belts, chains, friction couplers, and/or viscous couplers connected between power source 16 and one or both of electric machines 18, 19. Some of these power-transfer components may be operable to selectively disconnect power source 16 from one or both of electric machines 18, 19. Similarly, power system 12 may include various additional power-transfer components connected between electric machine 20 and propulsion devices 14. Additionally, power system 12 may include additional electric machines drivingly connected to propulsion devices 14. In some embodiments, power system 12 may include one or more dedicated electric machines for each propulsion device 14. Furthermore, machine 10 may include fewer or more propulsion devices 14 than FIGS. 1-3 show. Additionally, in some embodiments, machine 10 may omit propulsion devices 14.

Additionally, power system 12 may have different combinations of electrical components connected to electrical power-transfer system 12 than shown in FIGS. 1-3. For example, power system 12 may omit electrical storage device 27 and/or braking resistor and chopper 29, in which case power system 12 may also omit the associated components of power-system controls 12. Also, in addition to the electrical components shown in FIGS. 1 and 2, power system 12 and machine 10 may include various other electrical components connected to electrical power-transfer network 25.

INDUSTRIAL APPLICABILITY

Machine 10 and power system 12 may have application wherever power is required for performing one or more tasks. Operation of machine 10 and power system 12 will be described herein below.

Under some circumstances, power-system controls 22 may operate power system 12 to generate electricity with electric machine 18 and/or electric machine 19. Controller 58 may cause power source 16 to produce power and drive rotor 24 and, in the embodiment shown in FIG. 1, rotor 26. Simultaneously, controllers 59, 60 and power regulators 52, 54 may cause and regulate generation of electricity in one or both of stator windings 30, 32 while transferring the generated electricity to electrical power-transfer network 25. Using information from the various sources of information they are connected to, controllers 58, 59, 60 may adjust the power output of power source 16 and the rate of electricity generation in stator windings 30, 32 as necessary to meet varying power needs and other objectives. When electrical power needs are high, controllers 59, 60 may operate both power regulator 52 and power regulator 54 to cause and regulate generation of electricity. In this manner, controllers 59, 60 may effect generation of electricity at rates as high as the aggregate power capacity of power regulators 52, 54 or the power capacity of power source 16, whichever is lower.

The generated electricity may be received by various devices for various purposes. For example, under some circumstances, some of the generated electricity may be received by electrical storage device 27 and stored for later use by other devices connected to electrical power-transfer network 25. Additionally, under some circumstances, such as in response to an acceleration request from an operator, controller 61 may cause power regulator 56 to supply electricity from electrical power-transfer network 25 to stator winding 34 to cause electric machine 20 to operate as an electric motor and propel machine 10.

Once machine 10 is in motion, if an operator makes a braking request with brake pedal 70, power-system controls 22 may operate power system 12 to electrically brake machine 10. In order to electrically brake machine 10, controller 61 and power regulator 56 may cause electric machine 20 to generate electricity using kinetic energy transferred from machine 10, through propulsion devices 14, to rotor 28.

Power-system controls 22 may coordinate use of electricity generated through such electrical braking of machine 10. Various electrical loads (not shown), such as lights, a radio, and/or other electrical devices, may draw some of the electricity from electrical power-transfer network 25. If such other electrical loads do not consume all of the electric power generated by electrical braking and electrical storage device 27 is not at its full charge capacity, controller 62 may cause power regulator 57 to transfer power to electrical storage device 27. Controller 62 and power regulator 57 may limit the rate at which electricity is transferred to electrical storage device 27 to prevent charging electrical storage device 27 at an undesirably high rate.

If the above-described activities do not consume all of the electrical power generated by electrical braking, controller 59 may cause power regulator 52 to regulate current supply to stator winding 30 in such a manner to cause electric machine 18 to operate as an electric motor. Simultaneously, controller 58 may suppress power production of power source 16, such as by suppressing fuel delivery to power source 16, so that power source 16 absorbs power produced by electric machine 18 operating as an electric motor. Under such circumstances, operating electric machine 18 as an electric motor to drive power source 16 may dissipate electricity. Operating electric machine 18 to dissipate electricity by driving power source 16 may enable electrical braking at an increased rate or for an increased period without overcharging electrical storage device 27. Additionally, using electricity to drive power source 16 under such circumstances may allow reducing fuel consumption by power source 16.

During electrical braking of machine 10, if it is necessary to dissipate electricity by driving power source 16 with electric machine 18, controller 59 and power regulator 52 may adjust the flow of electricity to electric machine 18 as necessary to ensure that all electric power generated by electrical braking is consumed. However, controller 59 and power regulator 52 may only do so up to the capacity of power source 16 and electric machine 18 to dissipate electricity. The capacity of power source 16 and electric machine 18 to dissipate electricity may be determined by the capacity of power source 16 to absorb power from electric machine 18 and the efficiency of electric machine 18.

During electrical braking, if electric machine 18 is operating at its full capacity to dissipate electricity by driving power source 16 and there remains a need to dissipate more electric power generated by electrical braking, controller 63 may cause braking resistor and chopper 29 to dissipate electricity. Under such circumstances, controller 63 may adjust the amount of electricity dissipated by braking resistor and chopper 29 as necessary to ensure that all electric power generated by electrical braking is dissipated, up to the power capacity of braking resistor and chopper 29. If braking resistor and chopper 29 reaches its full power capacity, controller 61 and power regulator 56 may limit the amount of power generated by electric machine 20 to prevent damage to electrical components of power system 12.

Coordination of power distribution between the various electrical devices of power system 12 is not limited to the examples provided herein above. For example, use of electricity generated by electrical braking may be prioritized in a different manner than discussed above. Additionally, use of electricity generated by electrical braking may be controlled according to various other types of control algorithms other than prioritization.

In addition to operating electric machine 18 as an electric motor to dissipate electricity during electrical braking, power-system controls 22 may also operate electric machine 18 as an electric motor under various other circumstances. For example, power-system controls 22 may operate electric machine 18 as an electric motor to drive power source 16 when starting power source 16 operating under its own power. Additionally, if other power loads are drivingly connected to power source 16 and/or electric machine 18, power-system controls 22 may operate electric machine 18 as an electric motor to assist power source 16 in driving those other loads.

When causing operation of electric machine 18 as an electric motor, controller 59 may use inputs from its various sources of information to adjust operation of power regulator 52 as necessary to meet various objectives. For example, in some embodiments, when driving power source 16 with electric machine 18 during electrical braking, controller 59 may adjust the operation of power regulator 52 to maintain voltage in electrical power-transfer network 25 near a target level. Additionally, when causing electric machine 18 to drive power source 16 to enable power source 16 commencing operation under is own power, controller 59 may adjust the operation of power regulator 18 to cause electric machine 18 to drive power source 16 at a target speed.

The disclosed embodiments may provide a number of performance and cost benefits. Many factors may make it desirable for power system 12 to have a higher capacity for regulating generated electricity than would be necessary for regulating electricity for operating electric machine 18 as an electric motor. For example, power source 16 may be able to produce and transmit more power to electric machines 18, 19 when they operate as electric generators than power source 16 can absorb from electric motor 18 when it operates as an electric motor. Additionally, in many applications, it may be desirable to construct the power regulators that regulate electricity generated by power source 16 with a power capacity substantially equal to that of the capacity to generate electricity with power source 16. However, this power capacity may be greater than the power capacity necessary for regulating electricity used to drive power source 16 with electric machine 18 because of the inability of power source 16 to absorb as much power as it can produce.

The disclosed embodiments may allow separately tailoring the capacity of power system 12 to regulate electricity generated with power source 16 and the capacity of power system 12 to regulate electricity used to operate electric machine 18 as an electric motor. Bidirectional power regulator 52 may be constructed with capacity approximately equal to the desired capacity to regulate electricity used to operate electric machine 18 as an electric motor. Unidirectional power regulator 54 may be constructed such that the aggregate power capacity of bidirectional power regulator 52 and unidirectional power regulator 54 is equal to or greater than the desired capacity to regulate generation of electricity with power source 16. For example, unidirectional power regulator 54 may be constructed such that this aggregate power capacity is equal to or greater than the capacity to generate electricity with power from power source 16.

This approach may be a cost-effective way to provide power system 12 with the desired power-regulation capacities. Unidirectional power regulator 54 may be less expensive per unit of capacity than bidirectional power regulator 52. Accordingly, limiting the capacity of bidirectional power regulator 54 to the capacity desired for operating electric machine 18 as an electric motor and employing unidirectional power regulator 52 to provide the balance of capacity desired for generating electricity may keep the cost of power system 12 low.

It will be apparent to those skilled in the art that various modifications and variations can be made in the power system and methods without departing from the scope of the disclosure. Other embodiments of the disclosed power system and methods will be apparent to those skilled in the art from consideration of the specification and practice of the power system and methods disclosed herein. It is intended that the specification and examples be considered as exemplary only, with a true scope of the disclosure being indicated by the following claims and their equivalents.

What is claimed is:

1. A power system of a mobile machine, including:
    a power source;
    a first electric machine drivingly connected to the power source;
    a second electric machine drivingly connected to the power source;
    a third electric machine;
    one or more propulsion devices drivingly connected to the third electric machine; and
    power-system controls, including
    a bidirectional power regulator operable to cause the first electric machine to operate as an electric motor and also operable to cause and regulate generation of electricity by the first electric machine;
    a unidirectional power regulator operable to cause and regulate generation of electricity by the second electric; and
    wherein the power-system controls are operable to simultaneously drive the first electric machine and the second electric machine with the power source to generate electricity with both the first electric machine and the second electric machine with power from the power source, while operating the third electric machine as an electric motor to drive the one or more propulsion devices.

2. The power system of claim 1, wherein the power-system controls are configured to, under at least some circumstances, suppress power production of the power source and simultaneously operate the bidirectional power regulator to cause the first electric machine to operate as an electric motor.

3. The power system of claim 1, wherein:
    the power-system controls are further configured to
    when the mobile machine is in motion, selectively cause the power system to electrically brake the mobile machine by using kinetic energy of the mobile machine to generate electricity, and
    while causing the power system to electrically brake the mobile machine, selectively operate the bidirectional power regulator to cause the first electric machine to operate as an electric motor.

4. The power system of claim 3, wherein the power-system controls are further operable to
    while causing the power system to electrically brake the mobile machine and operating the bidirectional power regulator to cause the first electric machine to operate as an electric motor, suppress power production by the power source.

5. The power system of claim 1, wherein the power system controls are configured to operate the bidirectional power regulator to cause the first electric machine to operate as an electric motor to drive the power source when starting operation of the power source under its own power.

6. A method of operating a power system of a mobile machine, the power system having a power source, a first electric machine drivingly connected to the power source, a second electric machine drivingly connected to the power source, and a third electric machine drivingly connected to one or more propulsion devices, the method including:
    selectively operating a bidirectional power regulator to cause the first electric machine to operate as an electric motor;
    selectively operating the bidirectional power regulator to cause and regulate generation of electricity by the first electric machine;

selectively operating a unidirectional power regulator to cause and regulate generation of electricity by the second electric machine, including, while driving both the first electric machine and the second electric machine with the power source, operating the unidirectional power regulator to cause and regulate generation of electricity by the second electric machine with power from the power source, simultaneously operating the bidirectional power regulator to cause and regulate generation of electricity by the first electric machine with power from the power source, and simultaneously operating the third electric machine as an electric motor to drive the one or more propulsion devices.

7. The method of claim 6, further including:

under at least some circumstances, suppressing power production by the power source while operating the bidirectional power regulator to cause one or more of the electric machines to operate as an electric motor.

8. The method of claim 6, wherein:

the method further includes when the mobile machine is in motion, selectively electrically braking the mobile machine by using kinetic energy of the mobile machine to generate electricity; and wherein selectively operating the bidirectional power regulator to cause one or more of the electric machines to operate as an electric motor includes selectively operating the bidirectional power regulator to cause one or more of the electric machines to operate as an electric motor while electrically braking the mobile machine.

9. The method of claim 8, further including:

while electrically braking the mobile machine and operating the bidirectional power regulator to cause one or more of the electric machines to operate as an electric motor, suppressing power production by the power source.

10. The method of claim 6, wherein selectively operating the bidirectional power regulator to cause one or more of the electric machines to operate as an electric motor includes operating the bidirectional power regulator to cause one or more of the electric machines to operate as an electric motor to drive the power source when starting the power source operating under its own power.

* * * * *